US012732749B2

(12) United States Patent
Yu

(10) Patent No.: US 12,732,749 B2
(45) Date of Patent: Sep. 8, 2026

(54) METHOD AND APPARATUS FOR OUTPUTTING SOUND SOURCE BASED ON AMPLIFICATION POWER CONTROL ACCORDING TO VOLUME LEVEL

(71) Applicant: Meewang Inc., Seoul (KR)

(72) Inventor: Seung Ho Yu, Incheon (KR)

(73) Assignee: Meewang, Inc. (KR)

( * ) Notice: Subject to any disclaimer, the term of this patent is extended or adjusted under 35 U.S.C. 154(b) by 149 days.

(21) Appl. No.: 18/595,089

(22) Filed: Mar. 4, 2024

(65) Prior Publication Data

US 2024/0305926 A1 Sep. 12, 2024

(30) Foreign Application Priority Data

Mar. 6, 2023 (KR) ........................ 10-2023-0029487

(51) Int. Cl.
*H04R 3/00* (2006.01)
*H04R 29/00* (2006.01)

(52) U.S. Cl.
CPC ............. *H04R 3/00* (2013.01); *H04R 29/001* (2013.01)

(58) Field of Classification Search
CPC ...... H03G 3/004; H03G 3/3005; H03G 3/007; H03G 3/301; H03G 7/007; H03F 2200/03; H03F 3/181; H03F 1/30; H04R 5/04; H04R 2201/028; H04R 2430/01; H04R 2460/03
USPC .......................................................... 381/104
See application file for complete search history.

(56) References Cited

U.S. PATENT DOCUMENTS

2007/0274531 A1* 11/2007 Camp ...................... H04R 5/04 381/74
2010/0145706 A1* 6/2010 Kato ...................... G10L 13/10 704/266
2014/0072144 A1* 3/2014 Wu ...................... H03F 1/0244 381/107
2017/0026015 A1* 1/2017 Hartung .................. H03G 3/32
2020/0059214 A1* 2/2020 Perrott ................ H03F 3/45475
2021/0208842 A1* 7/2021 Cassidy ................. G05B 15/02

FOREIGN PATENT DOCUMENTS

JP 2012-209612 A 10/2012

* cited by examiner

*Primary Examiner* — Carolyn R Edwards
*Assistant Examiner* — Friedrich Fahnert

(57) ABSTRACT

Disclosed are a sound source output apparatus based on amplification power source control according to a volume level and an operating method thereof. The sound source output method according to the exemplary embodiment of the present disclosure includes a volume level sensing step of sensing a volume level; a control step of generating a voltage control signal by determining an amplification power voltage for an amplification operation based on the sensed volume level; a power applying step of applying the adjusted amplification power voltage based on the voltage control signal; an audio signal generating step of generating an audio signal by performing an amplifying operation of the sound signal which is converted based on the amplification power voltage; and an audio output step of outputting the audio signal.

12 Claims, 7 Drawing Sheets

100

METHOD AND APPARATUS FOR OUTPUTTING SOUND SOURCE BASED ON AMPLIFICATION POWER CONTROL ACCORDING TO VOLUME LEVEL

CROSS-REFERENCE TO RELATED APPLICATIONS

This application claims priority to and the benefit of Korean Patent Application No. 10-2023-0029487 filed in the Korean Intellectual Property Office on Mar. 6, 2023, the entire contents of which are incorporated herein by reference.

TECHNICAL FIELD

The present disclosure relates to a sound source output apparatus which minimizes power consumption based on amplification power control according to a volume level and an operating method thereof.

BACKGROUND ART

The contents described in this section merely provide background information on the exemplary embodiment of the present disclosure, but do not constitute the related art.

In accordance with the improvement of a sound source output technique, various studies to improve a texture of the audio output are being conducted.

There are various components which affect the texture of the audio output. In a general sound source output apparatus, clearer and richer audio signals are provided to users by means of signal conversion and amplification processing and the operation of amplifying a signal has a particular impact on the audio output texture.

Generally, the sound source output apparatus which outputs an audio signal applies a power which is supplied to an amplifier for amplification processing by setting a voltage based on the maximum volume level.

Therefore, even though a user sets a volume level low to hear a sound quietly, there is a problem in that a voltage applied to the amplifier is provided based on a maximum volume level so that unnecessary power consumption is caused.

SUMMARY OF THE INVENTION

A main object of the present disclosure is to provide a sound source output apparatus based on amplification power control according to a volume level which determines an amplification power voltage for an amplifying operation based on a sensed volume level to generate a voltage control signal and applies an amplification power voltage adjusted based on the voltage control signal to output an amplified audio signal and an operating method thereof.

According to an aspect of the present disclosure, in order to achieve the above-described objects, a method for outputting a sound source from a sound output apparatus includes a volume level sensing step of sensing a volume level; a control step of generating a voltage control signal by determining an amplification power voltage for an amplification operation based on the sensed volume level; a power applying step of applying the adjusted amplification power voltage based on the voltage control signal; an audio signal generating step of generating an audio signal by performing an amplifying operation of the sound signal which is converted based on the amplification power voltage; and an audio output step of outputting the amplified audio.

Further, according to another aspect of the present disclosure, in order to achieve the above-described objects, an apparatus for outputting a sound source includes a volume level sensing unit which senses a volume level; a controller which generates a voltage control signal by determining an amplification power voltage for an amplification operation based on the sensed volume level; a power source unit which applies the adjusted amplification power voltage based on the voltage control signal; an audio signal generator which generates an audio signal by performing an amplifying operation of the sound signal which is converted based on the amplification power voltage; and an audio output unit which outputs the amplified audio.

As described above, according to the present disclosure, unnecessary power consumption according to a volume level for an audio output is minimized so that an audio playable time is increased.

Further, according to the present disclosure, an optimal amplification power voltage is determined so that the current is optimized by current control for the amplification power voltage.

DETAILED DESCRIPTION OF THE EMBODIMENT

Hereinafter, exemplary embodiments of the present disclosure will be described in detail with reference to the accompanying drawings. In the description of the present disclosure, if it is considered that the specific description of related known configuration or function may cloud the gist of the present disclosure, the detailed description will be omitted. Further, hereinafter, exemplary embodiments of the present disclosure will be described. However, it should be understood that the technical spirit of the invention is not restricted or limited to the specific embodiments, but may be changed or modified in various ways by those skilled in the art to be carried out. Hereinafter, a sound source output apparatus based on amplification power control according to a volume level proposed by the present disclosure and an operating method thereof will be described in more detail with reference to the drawings.

Figure 1:
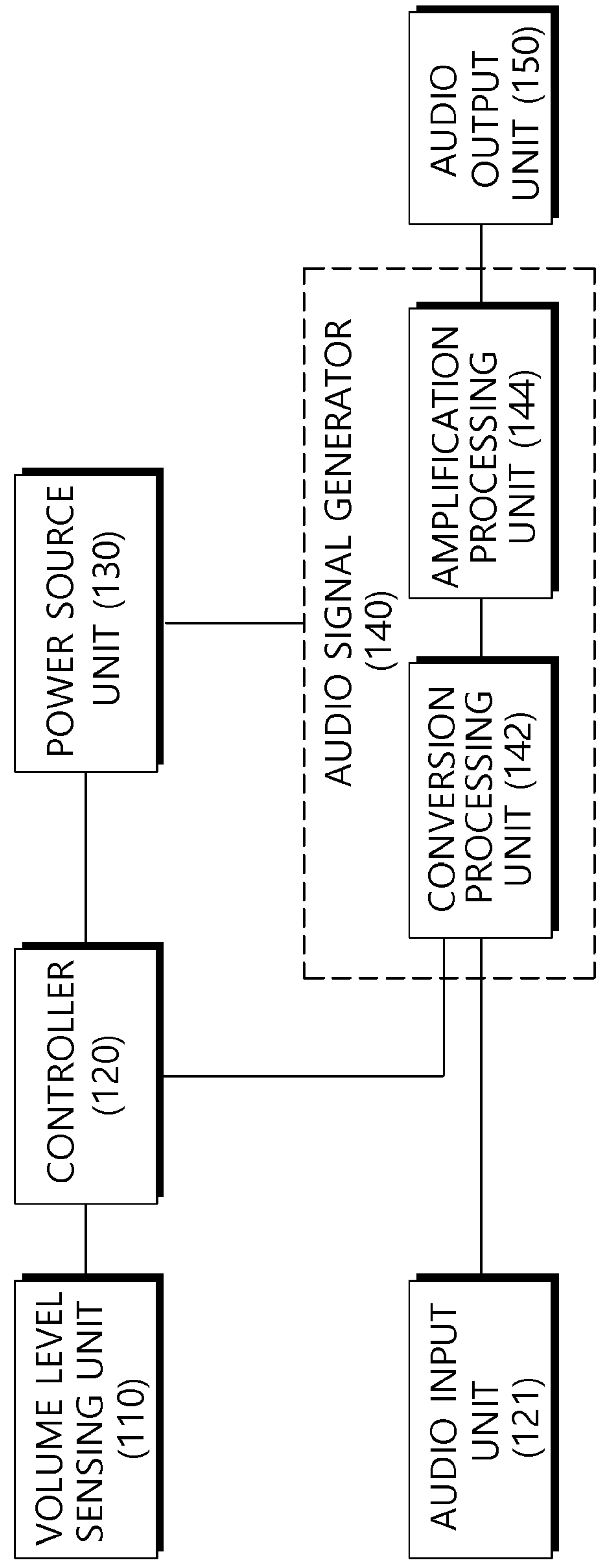
FIG. 1 is a block diagram schematically illustrating a sound source output apparatus based on amplification power control according to an exemplary embodiment of the present disclosure.
Figure 2:
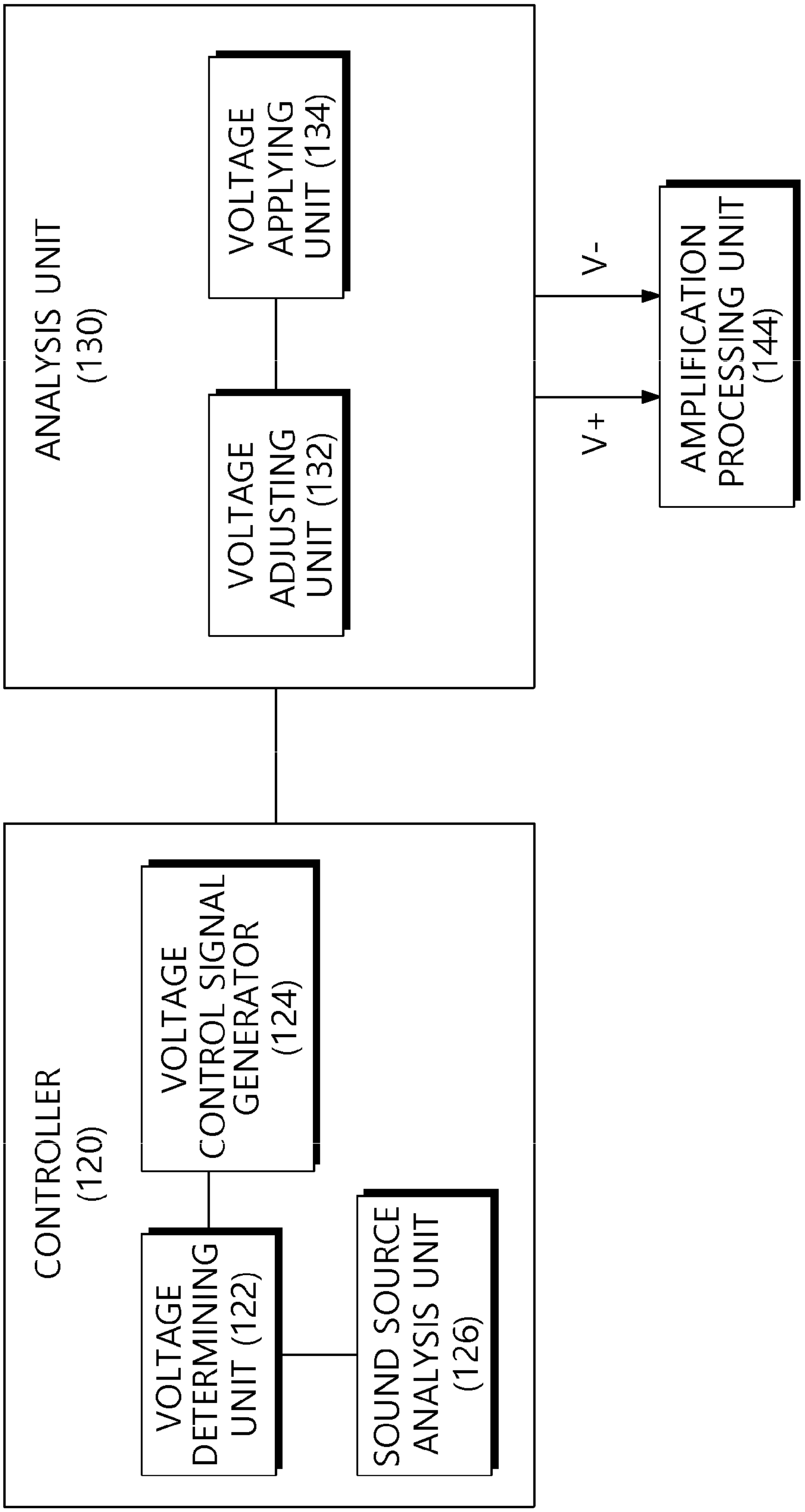
FIG. 2 is a block diagram for explaining an amplification power control operation of a sound source output apparatus according to an exemplary embodiment of the present disclosure.

FIG. 1 is a block diagram schematically illustrating a sound source output apparatus based on amplification power control according to an exemplary embodiment of the present disclosure and FIG. 2 is a block diagram for explaining an amplification power control operation of a sound source output apparatus according to an exemplary embodiment of the present disclosure.

The sound source output apparatus 100 according to the exemplary embodiment includes a volume level sensing unit 110, a controller 120, an audio input unit 121, a power source unit 130, an audio signal generator 140, and an audio output unit 150. The sound source output apparatus 100 of FIGS. 1 and 2 is an example so that all blocks illustrated in FIGS. 1 and 2 are not essential components and in the other exemplary embodiment, some blocks included in the sound source output apparatus 100 may be added, modified, or omitted.

The sound source output apparatus 100 is an apparatus which outputs an audio and refers to a sound source output apparatus based on amplification power control according to a volume level. The sound source output apparatus 100 may be a high fidelity (Hi-Fi) digital audio player (DAP). Hereinafter, components included in the sound source output apparatus 100 will be described.

The volume level sensing unit 110 performs an operation of sensing a volume level of the sound source output apparatus 100. The volume level sensing unit 110 senses a change in a volume level according to manipulation of a user or an input.

The volume level sensing unit 110 may be an encoder for adjusting a volume, but is not necessarily limited thereto and as long as a volume level can be sensed using a signal generated by adjusting a volume, the volume level sensing unit may be implemented as various types (for example, a switch).

The volume level sensing operation of the volume level sensing unit 110 is the same as the volume level sensing operation of a general sound source output apparatus so that a detailed description thereof will be omitted.

The controller 120 determines an amplification power voltage for an amplifying operation based on the sensed volume level to generate a voltage control signal.

The controller 120 according to the exemplary embodiment includes a voltage determining unit 122 and a voltage control signal generator 124.

The voltage determining unit 122 compares the sensed volume level with a predetermined volume table to determine an amplification power voltage for an amplifying operation. Here, the volume table is a table including a plurality of steps obtained by dividing a minimum value or a maximum value for a volume level in the unit of predetermined magnitude. Further, in the volume table, a voltage value corresponding to each step is set in advance and a voltage value corresponding to each step refers to a predetermined amplification power voltage expected to be required for the amplification processing unit 144 to output at a corresponding volume level. Here, the predetermined amplification power voltage may be used for the voltage determining unit 122 to derive a predicted amplification power voltage.

For example, the volume table is divided into 0 to 150 volume levels and different amplification power voltages are set to each of 0 to 150 steps or steps obtained by combining some steps.

The voltage determining unit 122 compares a predicted amplification power voltage derived by comparing the sensed volume level with the volume table with a predetermined reference amplification power voltage and determines an amplification power voltage based on a comparison result. Here, the reference amplification power voltage is a minimum voltage value required for the amplification processing of the amplification processing unit 144 and refers to a minimum amplification power voltage.

When the predicted amplification power voltage is equal to or lower than the reference amplification power voltage, the voltage determining unit 122 determines the reference amplification power voltage as an amplification power voltage.

In other words, when the predicted amplification power voltage is equal to or lower than the reference amplification power voltage, the voltage determining unit 122 determines the reference amplification power voltage as an amplification power voltage to change the amplification power voltage which is applied to the amplification processing unit 144 to the reference amplification power voltage which is a minimum amplification power voltage. Here, when the currently set amplification power voltage is the reference amplification power voltage, the voltage determining unit 122 determines the amplification power voltage to maintain the currently determined amplification power voltage.

In the meantime, when the predicted amplification power voltage exceeds the reference amplification power voltage, the voltage determining unit 122 determines the predicted amplification power voltage as an amplification power voltage.

In other words, when the predicted amplification power voltage exceeds the reference amplification power voltage, the voltage determining unit 122 determines the predicted amplification power voltage as an amplification power voltage to adjust the currently set amplification power voltage, that is, an amplification power voltage which is currently being applied to the amplification processing unit 144 according to a volume level.

The voltage control signal generator 124 generates a voltage control signal based on the determined amplification power voltage.

The voltage control signal generator 124 generates a voltage control signal to control the power of the power source unit 130 with the determined amplification power voltage.

The voltage control signal generator 124 generates a voltage control signal including a voltage value of the amplification power voltage and an adjustment signal (a signal for adjusting a voltage, such as switching control) for adjusting the amplification power voltage.

The voltage control signal generator 124 outputs the voltage control signal to the power source unit 130 using general-purpose input/output (GPIO) or inter-integrated circuit (I2C).

In the meantime, the controller 120 further includes a sound source analysis unit 126.

The sound source analysis unit 126 performs an operation of analyzing a sound source signal which is input through the audio input unit 121 to extract sound source analysis information.

The sound source analyzer 126 extracts sound source analysis information including genre information of the sound source signal and sound wave analysis information about a sound wave of a sound source signal.

The sound source analyzer 126 identifies a genre of the sound source based on tag information included in the sound source signal to derive genre information. Here, the tag information refers to attribute information of the sound source and the attribute information includes various information, such as artist information, a song title, an album title, a genre, and a year.

Further, the sound source analyzer 126 analyzes a wave form of a sound wave of the sound source signal (a maximum sound wave, a minimum sound wave, and a sound wave difference) to derive sound wave analysis information about a sound width.

The sound source analyzer 126 generates sound source analysis information including one or both of genre information and sound wave analysis information.

The sound source analysis unit 126 transmits sound source analysis information to the voltage determining unit 122.

The voltage determining unit 122 determines an amplification power voltage by further considering the sound source analysis information.

Hereinafter, an operation of determining an amplification power voltage by further considering the sound source analysis information will be described.

The voltage determining unit 122 determines the amplification power voltage by adjusting the voltage for every genre based on genre information included in the sound source analysis information.

The voltage determining unit 122 further adjusts the amplification power voltage according to a predetermined sound width which is used for every genre to finally determine the amplification power voltage.

For example, when it is identified as POP genre based on the genre information, the voltage determining unit 122 further adjusts the amplification power voltage with a voltage value for amplifying the sound width corresponding to POP genre. In the meantime, when it is identified as classic genre based on the genre information, the voltage determining unit 122 further adjusts the amplification power voltage with a voltage value for amplifying the sound width corresponding to classic genre. Here, at the same volume level, the amplification power voltage for the classic genre may be adjusted to be lower than the amplification power voltage for the POP genre.

In the meantime, the voltage determining unit 122 determines the amplification power voltage by adjusting the voltage according to a sound width of the sound source signal based on sound wave analysis information included in the sound source analysis information.

The voltage determining unit 122 further adjusts the amplification power voltage according to a sound width of a sound source signal included in the sound wave analysis information to finally determine the amplification power voltage.

For example, the voltage determining unit 122 further adjusts the amplification power voltage with a voltage value for amplifying the sound width of the sound source signal included in the sound wave analysis information.

The voltage determining unit 122 according to the exemplary embodiment compares the predicted amplification power voltage with the reference amplification power voltage to preferentially determine the amplification power voltage and then further adjusts the voltage by considering one of the genre information and the sound wave analysis information included in the sound source analysis information to finally determine the amplification power voltage, but is not necessarily limited thereto.

For example, the voltage determining unit 122 derives a predicted amplification power voltage and considers one of the genre information and the sound wave analysis information included in the sound source analysis information to additionally adjust the voltage to determine the amplification power voltage.

Further, voltage determining unit 122 preferentially determines the amplification power voltage by comparing the predicted amplification power voltage with a reference amplification power voltage and then sequentially adjusts the voltage for the genre information and the voltage for sound wave analysis information to finally determine the amplification power voltage.

The audio input unit 121 receives a sound source signal and transmits the input sound source signal to the audio signal generator 140.

The audio input unit 121 transmits the sound source signal to a conversion processing unit 142 of the audio signal generator 140 through a sound source output path (an audio path). Here, the sound source signal is a digital discrete signal, but is not necessarily limited thereto, and may be a digital signal related to the sound source.

The audio input unit 121 is connected to a separate device or module including a processor or a memory to receive data about a sound source signal, but is not necessarily limited thereto.

In the meantime, even though it is described that the audio input unit 121 is a separate module for inputting the sound signal, it is not necessarily limited thereto and may be implemented as a component included in the controller 120.

The power source unit 130 performs an operation of applying an amplification power voltage adjusted based on the voltage control signal.

The power source unit 130 is connected to the audio signal generator 140 and supplies a power required for an operation of generating an audio signal.

The power source unit 130 supplies the power to the conversion processing unit 142 and the amplification processing unit 144 included in the audio signal generator 140, but the present disclosure is a technology for amplification power control according to a volume level so that a connection configuration of the drawing and the description of the power supply connection between the power source unit 130 and the conversion processing unit 142 will be omitted.

The power source unit 130 according to the exemplary embodiment includes a voltage adjusting unit 132 and a voltage applying unit 134.

The voltage adjusting unit 132 adjusts a predetermined voltage with the amplification power voltage based on the voltage control signal.

The voltage adjusting unit 132 adjusts a predetermined voltage to the amplification voltage through switching control of at least one of a plurality of resistors based on the voltage control signal.

The voltage adjusting unit 132 is desirably implemented by a digital potentiometer, but is not necessarily limited thereto and may be implemented by various types of modules as long as it can adjust the amplification power voltage.

The voltage adjusting unit 132 adjusts the amplification power voltage in the range of a first input voltage (v+) and a second input voltage (v−). Here, the range of the first input voltage and the second input voltage may be set to be equal to or larger than a magnitude of the predetermined reference amplification power voltage.

The voltage applying unit 134 applies the amplification power voltage adjusted in the voltage adjusting unit 132 for the amplifying operation to the amplification processing unit 144.

The voltage applying unit 134 applies the amplification power voltage corresponding to the range of a first input voltage (v+) and a second input voltage (v−) to the amplification processing unit 144.

The audio signal generator 140 performs an operation of generating an audio signal by performing the signal converting and amplifying operation based on the power supplied from the power source unit 130. The audio signal generator 140 performs the amplification operation of the sound signal which is converted based on the amplification power voltage to generate an audio signal.

The audio signal generator 140 according to the exemplary embodiment includes a conversion processing unit 142 and an amplification processing unit 144.

The conversion processing unit 142 performs an operation of receiving a sound source signal from the audio input unit 121 and converting a digital sound source signal into an analog signal.

The conversion processing unit 142 according to the exemplary embodiment is implemented to include at least one digital to analog converter (DAC).

The conversion processing unit 142 transmits the converted sound source signal (analog signal) to the connected amplification processing unit 144.

The amplification processing unit 144 performs an operation of receiving and amplifying a sound source signal (analog signal) output from the conversion processing unit 142.

The amplification processing unit 144 is implemented to include a plurality of amplifiers connected to each of at least one digital to analog converter.

The amplification processing unit 144 is applied with the amplification power voltage and performs the amplification processing operation using the amplification power voltage. Here, the amplification power voltage refers to the first input voltage (v+) or the second input voltage (v−) and the output of the amplification processing unit 144 is determined by the amplification power voltage.

The amplification processing unit 144 may be an operational amplifier (OPAMP), but is not necessarily limited thereto.

The audio output unit 150 performs an operation of outputting the generated audio signal.

The audio output unit 150 outputs an audio signal amplified based on the amplification power voltage.

The audio output unit 150 is connected to a separate audio output module (for example, a speaker, earphones, and headphones) to output an audio signal.

Figure 3:
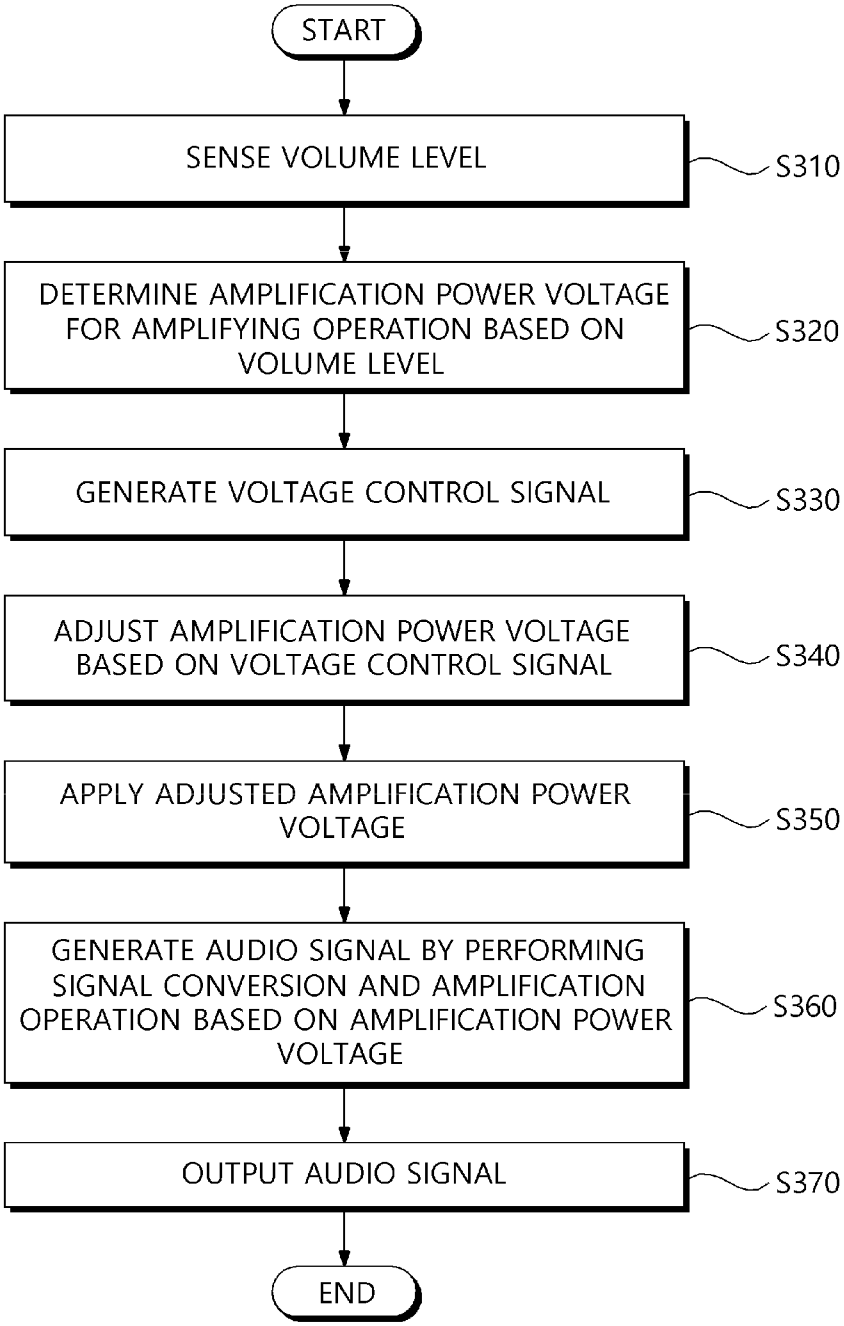
FIG. 3 is a flowchart for explaining a sound source output method based on amplification power control based according to an exemplary embodiment of the present disclosure.

FIG. 3 is a flowchart for explaining an amplification power control based sound source output method according to an exemplary embodiment of the present disclosure.

The sound source output apparatus 100 senses a volume level for an audio signal output (S310). The sound source output apparatus 100 senses a change in a volume level according to manipulation of a user or an input.

The sound source output apparatus 100 determines an amplification power voltage for an amplifying operation based on the sensed volume level (S320) and generates a voltage control signal based on the determined amplification power voltage (S330).

The sound source output apparatus 100 compares a predicted amplification power voltage derived by comparing the sensed volume level with the predetermined volume table with a predetermined reference amplification power voltage and determines an amplification power voltage based on a comparison result. Here, the reference amplification power voltage is a minimum voltage value required for the amplification processing and refers to a minimum amplification power voltage.

The sound source output apparatus 100 determines an amplification power voltage by further considering the sound source analysis information.

The sound source output apparatus 100 further adjusts the amplification power voltage according to a predetermined sound width used for every genre based on the genre information included in the sound source analysis information to finally determine an amplification power voltage.

In the meantime, the sound source output apparatus 100 further adjusts the amplification power voltage according to a sound width of the sound source signal based on sound wave analysis information included in the sound source analysis information to finally determine an amplification power voltage.

The sound source output apparatus 100 adjusts a voltage value of the amplification power voltage based on the power control signal (S340) and applies the adjusted amplification power voltage (S350).

The sound source output apparatus 100 adjusts a predetermined voltage to the amplification voltage through switching control of at least one of a plurality of resistors based on the voltage control signal.

The sound source output apparatus 100 generates an audio signal by performing signal conversion and amplification operation based on the applied amplification power voltage to generate an audio signal (S360) and outputs the generated audio signal (S370).

Even though in FIG. 3, it is described that the steps are sequentially performed, the present invention is not necessarily limited thereto. In other words, the steps illustrated in FIG. 3 may be changed or one or more steps may be performed in parallel so that FIG. 3 is not limited to a time-series order.

The sound source output method according to the exemplary embodiment described in FIG. 3 may be implemented by an application (or a program) and may be recorded in a terminal (or computer) readable recording media. The recording medium which has the application (or program) for implementing the sound source output method according to the exemplary embodiment recorded therein and is readable by the terminal device (or a computer) includes all kinds of recording devices or media in which computing system readable data is stored.

Figure 4:
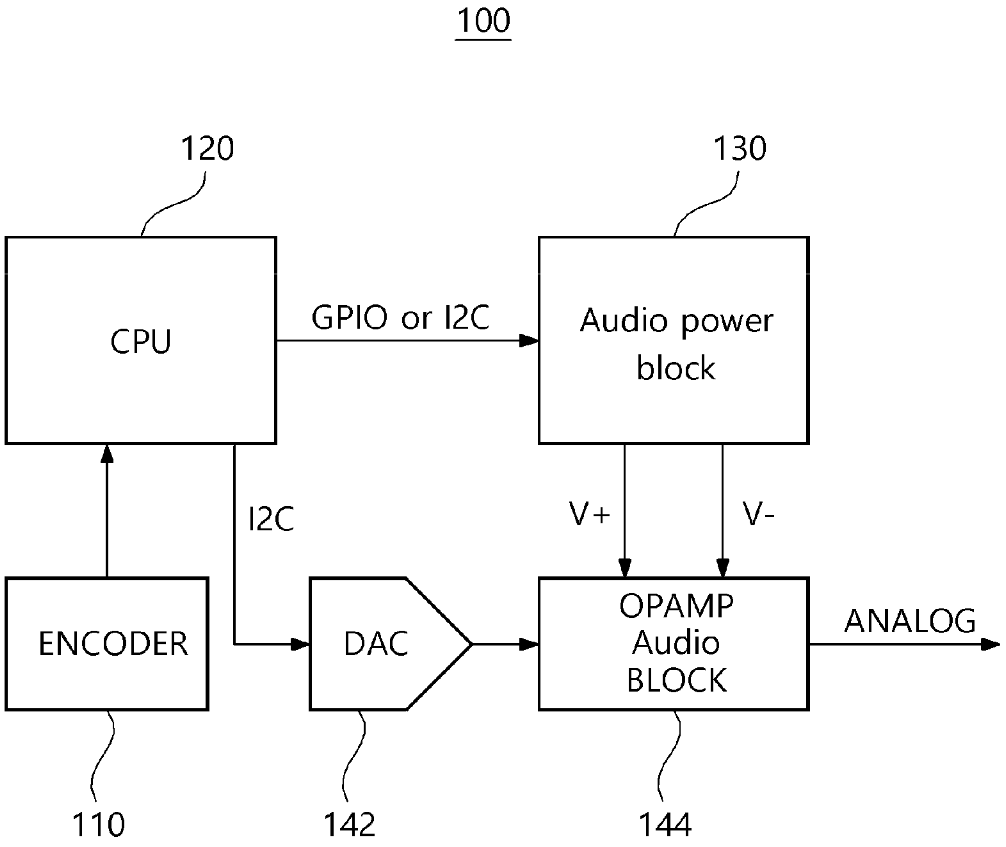
FIG. 4 is a view illustrating a hardware configuration of a sound source output apparatus based on amplification power control according to an exemplary embodiment of the present disclosure.

FIG. 4 is a view illustrating a hardware configuration of a sound source output apparatus based on amplification power control according to an exemplary embodiment of the present disclosure.

Referring to FIG. 4, a volume level sensor 110 of the sound source output apparatus 100 according to the exemplary embodiment is implemented by an encoder, the controller 120 is implemented by a central processing unit (CPU), and the power source unit 130 is implemented by an audio power block. Further, the signal conversion unit 142 of the sound source output apparatus 100 is implemented by a digital-to-analog converter (DAC) and the amplification processing unit 144 is implemented by an operational amplifier (OPAMP) audio block.

A voltage of the operational amplifier (OPAMP) applied to a general sound source output apparatus sets an amplification power voltage based on a case in which a volume level of the output apparatus is the highest. However, there is a problem in that when the volume is down by the manipulation of the user, the power consumption thereby is increased.

In other words, generally, the amplification power voltage (V+, V−) of the power source unit 130 is a set voltage in a state in which there is no problem with the analog audio signal based on the maximum volume. That is, unnecessary power consumption occurs when listening at a low volume.

In order to solve the problem, the present disclosure proposes a method for minimizing the power consumption by changing the amplification power voltage according to the volume level.

The sound source output apparatus 100 basically sets to operate at a minimum allowable voltage (minimum amplification power voltage) of the operational amplifier OPAMP.

When the volume level is increased by the input of the encoder or the button input, the sound source output apparatus 100 changes the amplification power voltage (V+ and V−) so as not to cause the problem in the analog signal.

The sound source output apparatus 100 adjusts a predetermined voltage to the amplification power voltage based on the voltage control signal. The amplification power voltage applied to the operational amplifier (OPAMP) is adjusted by the voltage control signal transmitted using the method of general-purpose Input/Output (GPIO) or inter-integrated circuit (I2C).

The sound source output apparatus 100 adjusts the amplification power voltage according to the output level of the operational amplifier (OPAMP) using the digital potentiometer.

Even though it is described that the sound source output apparatus 100 controls the amplification power voltage for the operational amplifier (OPAMP), it is not necessarily limited thereto and also controls the voltage for various amplifiers, such as Class A amplifier or a tube amplifier.

Figure 5:
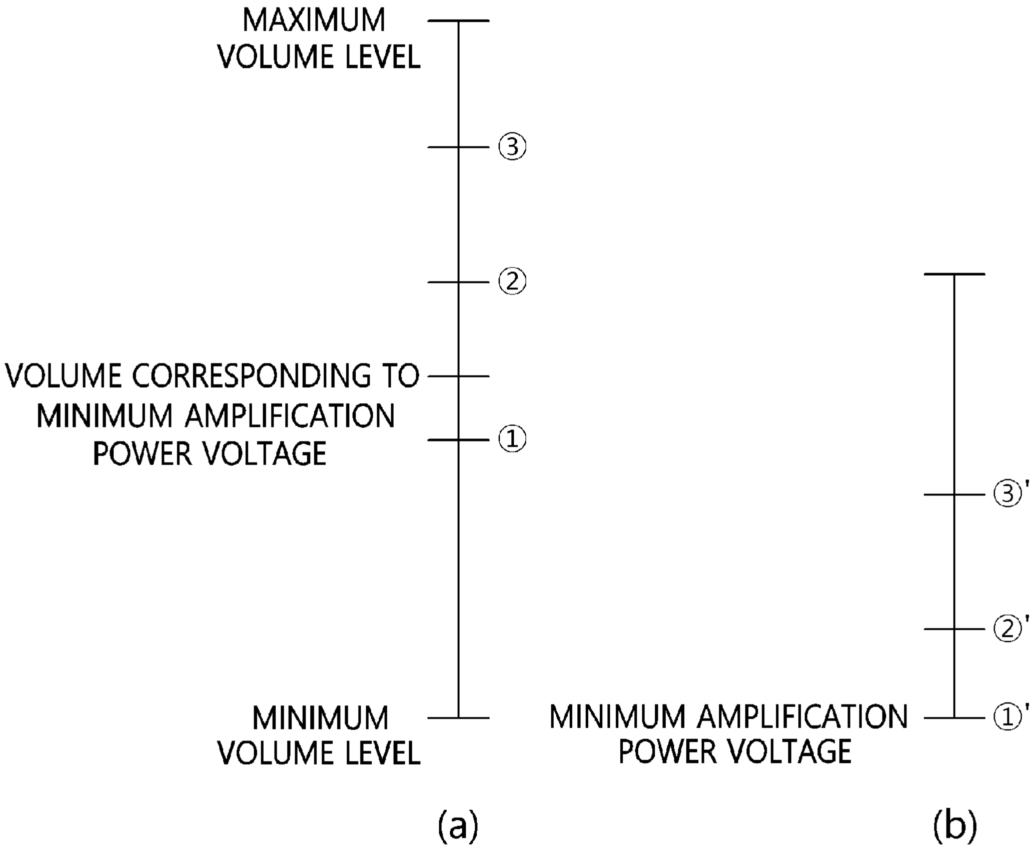
FIGS. 5, 6, and 7 are views for explaining an operation of determining an amplification power voltage to control an amplification power of a sound source output apparatus according to an exemplary embodiment of the present disclosure.
Figure 6:
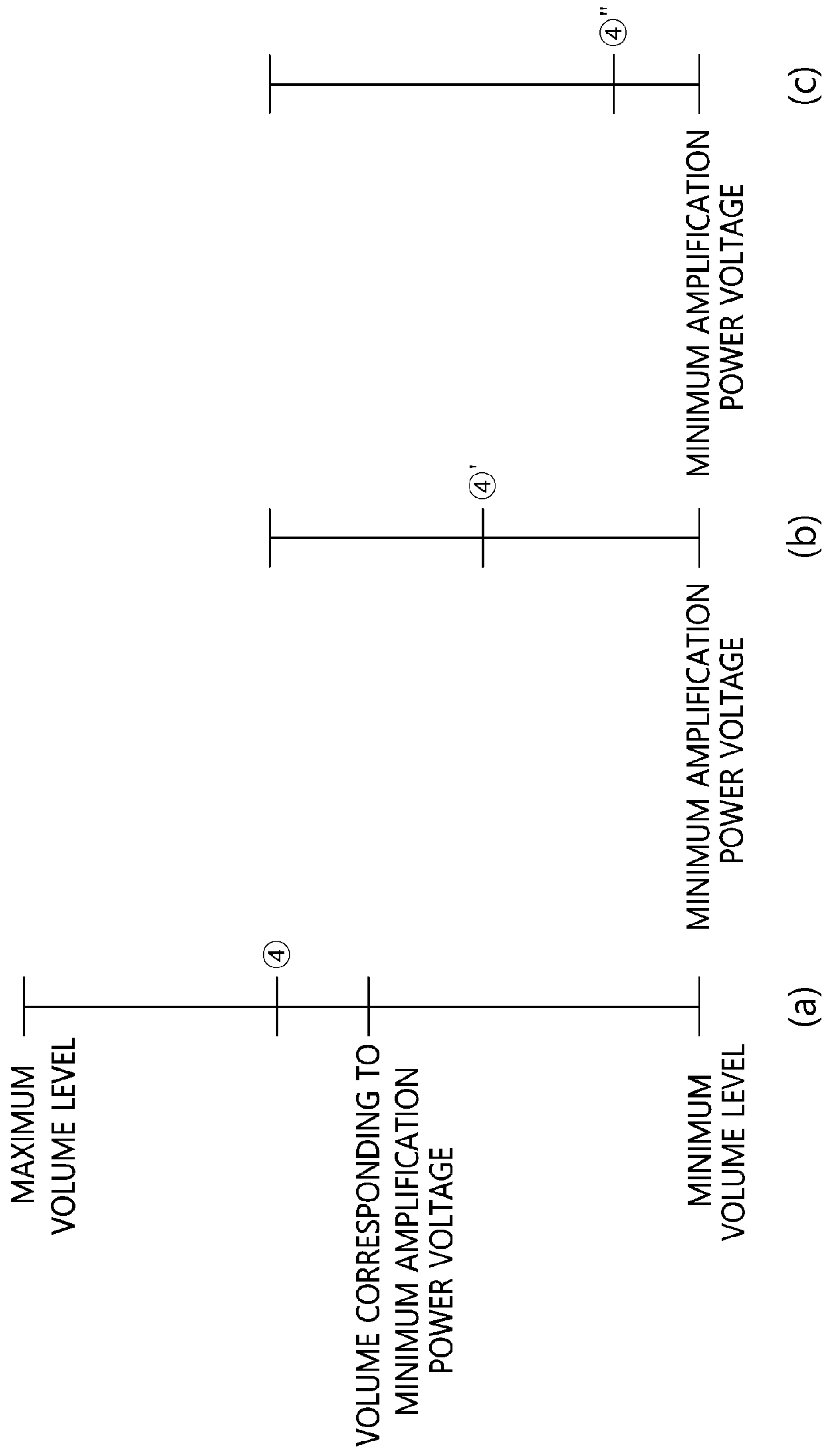
Figure 7:
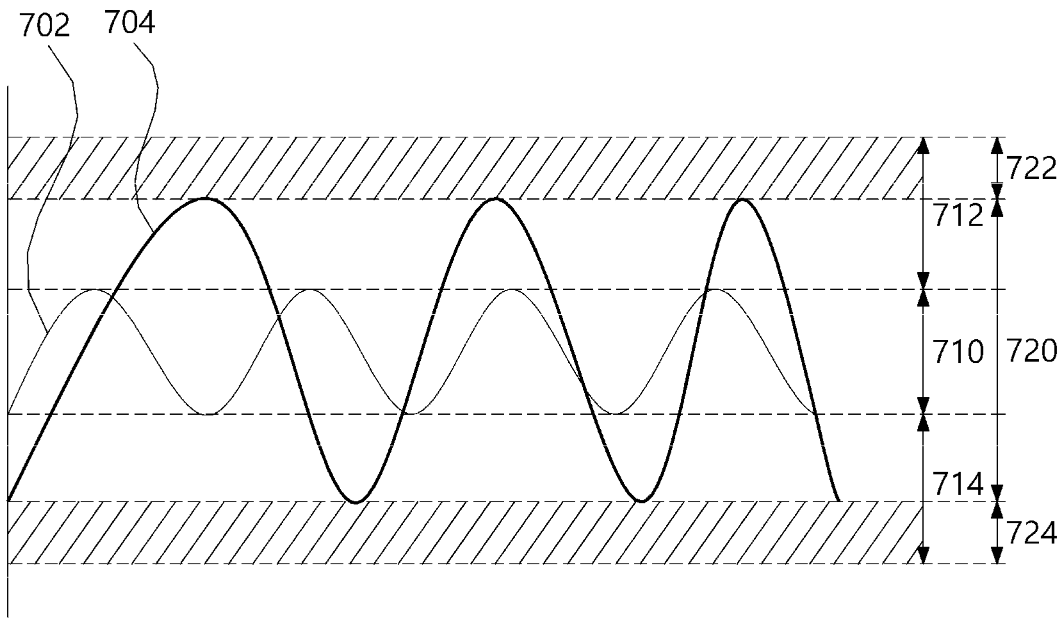

FIGS. 5 to 7 are views for explaining an operation of an amplification power voltage to control an amplification power of a sound source output apparatus according to an exemplary embodiment of the present disclosure.

FIG. 5 is an exemplary view for explaining an operation of determining an amplification power voltage by comparing a sensed volume level and a volume table.

FIG. 5A illustrates a volume table for comparing a sensed volume level and FIG. 5B illustrates an amplification power voltage determined according to a predicted amplification power voltage derived by the comparison result between the sensed volume level and the volume table.

For example, when the first volume level (1) is sensed, if a first predicted amplification power voltage derived by comparing the first volume level (1) with the volume table is equal to or lower than a predetermined minimum amplification power (a reference amplification power voltage), the voltage determining unit 122 determines a minimum amplification power (1') as an amplification power voltage.

Further, when a second volume level (2) is sensed, if a predicted amplification power voltage derived by comparing the second volume level (2) with the volume table exceeds a predetermined minimum amplification power (a reference amplification power voltage), the voltage determining unit 122 determines a second amplification power (2') as an amplification power voltage.

Further, when a third volume level (3) is sensed, if a predicted amplification power voltage derived by comparing the third volume level (3) with the volume table exceeds a predetermined minimum amplification power (a reference amplification power voltage), the voltage determining unit 122 determines a third amplification power (3') as an amplification power voltage.

FIGS. 6 and 7 are exemplary views for explaining an operation of determining an amplification power voltage by further considering genre information.

FIG. 6A illustrates a volume table for comparing a sensed volume level, FIG. 5B->6B illustrates an amplification power voltage determined by considering the first genre information, and FIG. 5C->6C illustrates an amplification power voltage determined by considering the second genre information.

When the fourth volume level (4) is sensed, the voltage determining unit 122 determines the amplification power voltage based on the fourth predicted amplification power voltage derived by comparing the fourth volume level (4) with the volume table and then finally determines the amplification power voltage by further considering the genre information.

The voltage determining unit 122 determines different amplification power voltage for the first genre information and the second genre information at the same volume level (4). Here, the first genre information may be information about POP genre and the second genre information may be information about classic genre.

When it is confirmed to be a first genre, the voltage determining unit 122 further adjusts the amplification power voltage with a voltage value for amplifying the sound width corresponding to the first genre information to finally determine the amplification power voltage (4') to be applied to the amplification processing unit 144. In the meantime, when it is confirmed to be a second genre, the voltage determining unit 122 further adjusts the amplification power voltage with a voltage value for amplifying the sound width corresponding to the second genre information to finally determine the amplification power voltage (4") to be applied to the amplification processing unit 144. Here, at the same volume level (4), the amplification power voltage (4") for the classic genre (second genre) may be adjusted to a voltage value which is lower than the amplification power voltage (4') for the POP genre (first genre).

FIG. 7 illustrates a waveform 704 of the sound wave for the first genre (POP) and a waveform 702 of the sound wave for the second genre (classic).

The voltage determining unit 122 further adjusts the amplification power voltage with a voltage value for amplifying the sound width 720 corresponding to the first genre (POP) to finally determine the amplification power voltage (4') to be applied to the amplification processing unit 144. Here, the first genre adjusts the amplification power voltage in consideration of sizes of head rooms 722 and 724.

In the meantime, the voltage determining unit 122 further adjusts the amplification power voltage with a voltage value for amplifying the sound width 710 corresponding to the second genre (classic) to finally determine the amplification power voltage (4") to be applied to the amplification processing unit 144. Here, the second genre adjusts the amplification power voltage in consideration of sizes of head rooms 712 and 714.

At the same volume level 4, the voltage determining unit 122 adjusts the amplification power voltage for the genre with a small size of head room to be lower so that the power consumption of the sound output apparatus 100 may be minimized.

It will be appreciated that various exemplary embodiments of the present disclosure have been described herein for purposes of illustration, and that various modifications and changes may be made by those skilled in the art without departing from the scope and spirit of the present invention. Accordingly, the exemplary embodiments of the present disclosure are not intended to limit but describe the technical spirit of the present invention and the scope of the technical spirit of the present invention is not restricted by the exemplary embodiments. The protective scope of the embodiment of the present disclosure should be construed based on the following claims, and all the technical concepts in the equivalent scope thereof should be construed as falling within the scope of the embodiment of the present disclosure.

What is claimed is:

1. A method for outputting a sound source by a sound source output apparatus, the method comprising:

a volume level sensing step of sensing a volume level by sensing a change in the volume level according to a manipulation or an input of a user;

a control step of generating a voltage control signal by determining an amplification power voltage for an amplification operation based on the sensed volume level;

a power applying step of applying the adjusted amplification power voltage based on the voltage control signal;

an audio signal generating step of generating an audio signal by performing an amplifying operation of the sound signal which is converted based on the amplification power voltage; and an audio output step of outputting the audio signal, wherein the control step includes:

a voltage determining step of determining the amplification power voltage for the amplifying operation by comparing the sensed volume level with a predetermined volume table; and a voltage control signal generating step of generating the voltage control signal for power source control with the determined amplification power voltage; and a sound source analysis step of analyzing the sound source signal to extract sound source analysis information including at least one or both of genre information of the sound source signal and sound wave analysis information on a sound wave of the sound source signal, wherein the voltage determining step, the amplification power voltage is determined by further considering the sound source analysis information, wherein, in the voltage determining step, the amplification power voltage is determined by comparing a predicted amplification power voltage with a reference amplification power voltage, and then a voltage adjustment for the genre information and a voltage adjustment for the sound wave analysis information are sequentially performed to finally determine the amplification power voltage.

2. The method for outputting a sound source according to claim 1, wherein in the voltage determining step, the predicted amplification power voltage is derived by comparing the sensed volume level with the predetermined volume table and compared with the predetermined reference amplification power voltage and the amplification power voltage is determined based on a comparison result.

3. The method for outputting a sound source according to claim 2, wherein in the voltage determining step, when the predicted amplification power voltage is equal to or lower than the reference amplification power voltage, the reference amplification power voltage is determined as the amplification power voltage.

4. The method for outputting a sound source according to claim 2, wherein in the voltage determining step, when the predicted amplification power voltage exceeds the reference amplification power voltage, the predicted amplification power voltage is determined as the amplification power voltage.

5. The method for outputting a sound source according to claim 1, wherein, in the voltage determining step, the amplification power voltage is adjusted based on a predetermined sound width used for each genre, according to the genre information, to finally determine the amplification power voltage.

6. The method for outputting a sound source according to claim 1, wherein, in the voltage determining step, the amplification power voltage is adjusted according to a sound width of the sound source signal, based on the sound wave analysis information, to finally determine the amplification power voltage.

7. The method for outputting a sound source according to claim 1, wherein the power applying step includes:

a voltage adjusting step of adjusting a predetermined voltage with the amplification power voltage based on the voltage control signal; and a voltage applying step of applying the adjusted amplification power voltage for the amplifying operation.

8. The method for outputting a sound source according to claim 7, wherein in the voltage adjusting step, the predetermined voltage is adjusted as the amplification power voltage by means of at least one switching of the plurality of resistors.

9. The method for outputting a sound source according to claim 7, wherein in the voltage adjusting step, the amplification power voltage is adjusted in the range of a first input voltage (v+) and a second input voltage (v−) and the range of the first input voltage and the second input voltage is equal to or larger than a magnitude of the predetermined reference amplification power voltage.

10. An apparatus for outputting a sound source, comprising:

a volume level sensing unit which senses a volume level by sensing a change in the volume level according to a manipulation or an input of a user;

a controller which generates a voltage control signal by determining an amplification power voltage for an amplification operation based on the sensed volume level;

a power source unit which applies the adjusted amplification power voltage based on the voltage control signal;

an audio signal generator which generates an audio signal by performing an amplifying operation of the sound signal which is converted based on the amplification power voltage; and an audio output unit which outputs the audio signal, wherein the controller includes:

a voltage determining unit which determines the amplification power voltage for the amplifying operation by comparing the sensed volume level with a predetermined volume table;

a voltage control signal generator which generates the voltage control signal for power source control with the determined amplification power voltage; and a sound source analysis unit which analyzes the sound source signal to extract sound source analysis information including at least one or both of genre information of the sound source signal and sound wave analysis information on a sound wave of the sound source signal, wherein the voltage determining unit determines the amplification power voltage by further considering the sound source analysis information, wherein the voltage determining unit determines the amplification power voltage by comparing a predicted amplification power voltage with a predetermined reference amplification power voltage, and then sequentially performs a voltage adjustment for the genre information and a voltage adjustment for the sound wave analysis information to finally determine the amplification power voltage.

11. The apparatus for outputting a sound source according to claim 10, wherein the voltage determining unit compares the predicted amplification power voltage derived by comparing the sensed volume level with the predetermined volume table with the predetermined reference amplification power voltage (a lowest amplification power voltage) and determines the amplification power voltage based on a comparison result.

12. The apparatus for outputting a sound source according to claim 10, wherein the voltage applying unit includes:

a voltage adjusting unit which adjusts a predetermined voltage as the amplification power voltage based on the voltage control signal; and a voltage applying unit which applies the adjusted amplification power voltage for the amplifying operation.

* * * * *